Feb. 5, 1963  H. E. WALKER  3,076,224
METHOD OF AND APPARATUS FOR CLEANING CUT FISH
Filed Sept. 30, 1960

Inventor
Harry E. Walker
by Morse + Altman
Attys.

3,076,224
METHOD OF AND APPARATUS FOR CLEANING CUT FISH
Harry E. Walker, Rte. 2, Mechanic Falls, Maine
Filed Sept. 30, 1960, Ser. No. 60,251
6 Claims. (Cl. 17—45)

This invention relates to a method of eviscerating fish which have been decapitated, and to apparatus for practicing such method. In the "sardine" packing industry as practiced along the coast of Maine, small herring are caught in large numbers and are packed, after being decapitated, in flat sardine cans of standard size and shape. If the entrails are removed as well as the heads, a better and more salable product is had.

It is an object of the present invention to provide means for removing the entrails from small fish quickly and economically. According to the invention this is done by the application of hydraulic suction to the cut end of the fish while maintaining a higher pressure on the flanks of the fish so that the entrails are virtually squeezed out of the cut end. This is done when the fish is completely submerged at a substantial depth from the surface of the water so that a greater than atmospheric pressure is exerted on the flanks of the fish when suction is applied to the cut end.

For a more complete understanding of the invention, reference may be had to the following description thereof and to the drawing, of which FIGURE 1 is an elevation of apparatus embodying the invention, including supply and discharge means;

Figure 1:
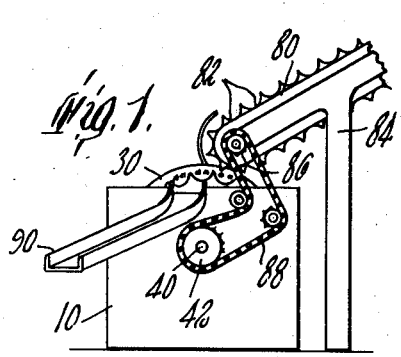
Figure 2:
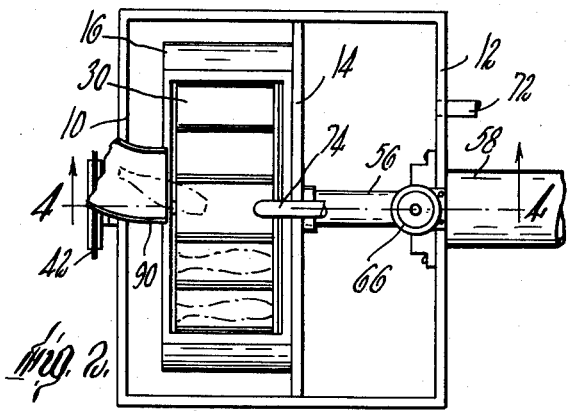
FIGURE 2 is a plan view, on a larger scale, of the cleaning apparatus indicated in FIGURE 1.
Figure 3:
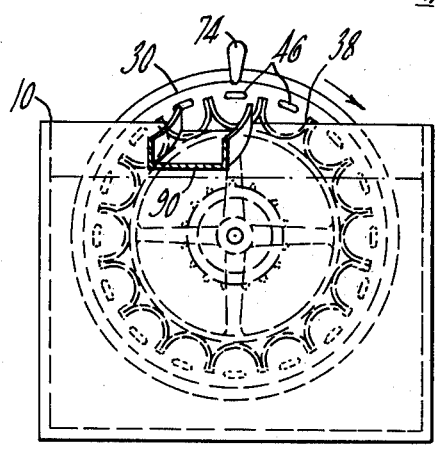
FIGURE 3 is a front elevation of the same.

The mechanism illustrated on the drawing is designed to present a series of decapitated fish in rapid succession to hydraulic suction while the fish are submerged in water. The application of hydraulic suction at the cut end of a fish reduces the pressure within the cavity containing the entrails to a value below the pressure of the water against the sides of the fish. The sides are thus pressed together forcing the entrails out from the cut end of the fish, this resulting in a choicer marketable product.

For the application of suction to the cut ends of a series of fish, two tanks 10 and 12 are provided with a wall 14 between them. In the tank 10 a drum 16 is removably mounted with its axis horizontal. The drum has circular front and rear walls 18 and 20, and a cylindrical wall 22. A segment of the upper portion of the front wall 18 and a corresponding portion of the cylindrical wall 22 are cut away to form an opening 24 at the top of the drum. Loosely fitted within the drum 16 is a conveyor wheel 30 which consists of a hub 32 with spokes 34 supporting a cylinder 36. Secured to the cylinder 36 are outwardly facing, axially extending troughs 38 in side-by-side contact. The wheel 30 fits loosely within the drum 16 and is mounted on a horizontal shaft 40 which extends through the front and rear walls of the drum 16 and is journalled in walls of the tank 10. A sprocket wheel 42 is mounted on an end portion of the shaft 40 which projects outside of the tank 10 for rotation of the wheel 30. The troughs 38 at the top of the wheel 30 appear in the opening 24 at the top of the drum 16. The other troughs face the cylindrical wall 22 of the drum and form therewith chambers in which fish deposited in the top troughs are carried around in the drum until they appear again in the opening 24. At the rear end of each trough is a wall 44 having one or more suitable apertures of suitable size and shape therethrough, a slot 46 being shown for each trough by way of example. The front wall 18 is provided with one or more openings 48 for free circulation of water from the tank 10 into the drum 16 and there is clearance between the wall 18 of the drum and the forward end of the wheel to provide free circulation of water in the wheel and the troughs thereon.

Figure 4:
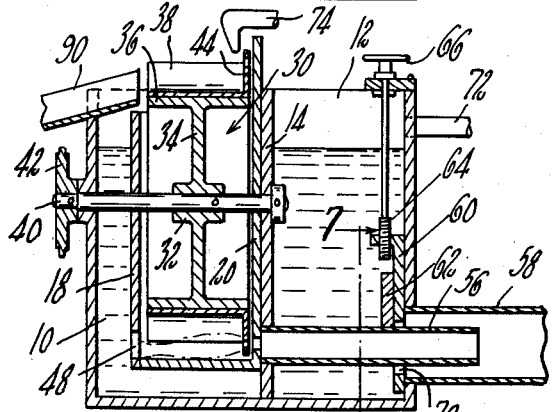
FIGURE 4 is a section on the line 4—4 of FIGURE 2.
Figure 5:
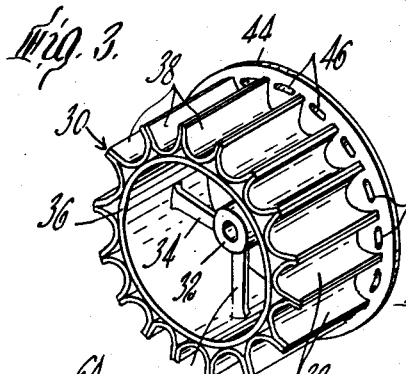
FIGURE 5 is a perspective view of the rotor shown in FIGURES 2 and 4.
Figure 6:
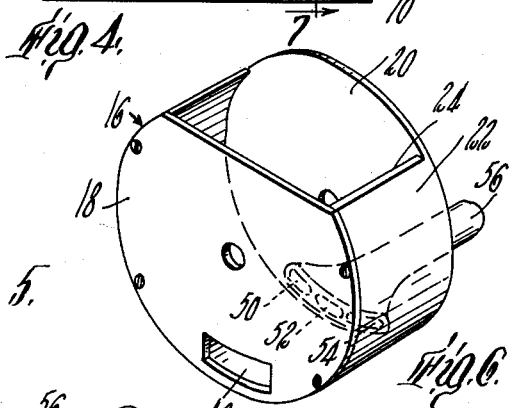
FIGURE 6 is a perspective view of the housing for the rotor.
Figures 7, 8:
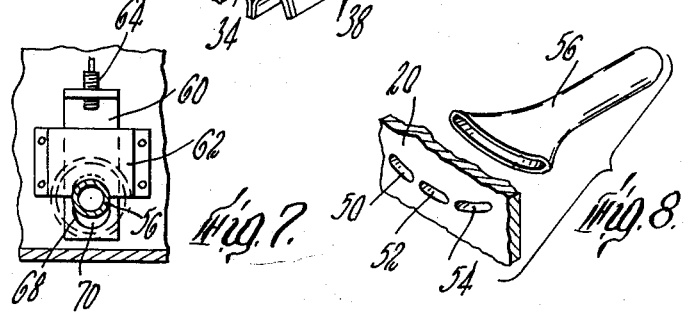
FIGURE 7 is a fragmentary sectional view on the line 7—7 of FIGURE 4.
FIGURE 8 is a perspective view of the suction nozzle leading from the tank.

In the lower portion of the rear wall 20 of the drum are three arcuate openings 50, 52, 54 which span the width of three troughs and register with slots 46 of the troughs as they pass while the wheel 30 is rotating. The openings 50, 52, 54 register with an enlarged orifice of a short pipe 56 which terminates at the wall 14 and extends across the tank 12 into a larger suction pipe 58 connected to a pump (not shown). The pipe 58 opens into the tank 12 so that it draws water both from that tank and from tank 10. The degree of suction created in the pipe 56 by the pump can be regulated by adjusting the size of the opening through which water in the tank 12 flows into the pipe 58. For this purpose a vertically slidable gate 60 is mounted across the orifice of the pipe 58. This gate is held against the wall of the tank 12 by a guide member 62 and is raised or lowered by any suitable means such as a screw 64 manually rotatable by a hand-wheel 66 conveniently located at the top of the tank. The gate 60 has a slot 68 therethrough wide enough for the pipe 56 to pass through with a clearance 70 below the pipe (FIGURES 4 and 7). Water in the tank 12 flows through this clearance into the suction pipe 58. By raising or lowering the gate 60, the clearance 70 may be diminished or increased.

Water is supplied to the two tanks by any convenient means such as pipe 72 which enters the tank 12, and a pipe 74 which discharges a stream of water onto the troughs 38 which successively pass under it.

Decapitated fish are brought to the conveyor wheel 30 by an endless belt conveyor 80 having a series of transverse troughs 82 in which fish are deposited by means not shown. The conveyor 80 passes around a wheel carried by a frame 84 and rotatable with a sprocket wheel 86. The sprocket wheel 86 may be connected by a chain 88 to the sprocket wheel 42 so that the movements of the conveyor 80 and the conveyor wheel 30 can be synchronized. The successive troughs of the conveyor 80 thus deposit fish in successive troughs of the wheel 30. The rotation of the wheel carries the fish down into the pool in the tank 10, the cut end of each fish being adjacent to the slotted end wall 44. As the fish passes the openings 50, 52, 54, the hydraulic suction at those orifices reduces the pressure inside the fish and the pressure of the water against the flanks of the fish squeezes the entrails out through the slot 46 of the trough and through the openings 50, 52, 54 into the pipe 58. The eviscerated fish is then carried by the wheel up to the opening 24. A discharge duct 90 is opposite the spout 74 so that when each trough 38 is in line with the discharge duct 90, the stream of water from the spout 74 washes the fish from the trough into the duct.

The two conveyors 80 and 30 are driven by suitable means (not shown) so that the evisceration process proceeds quickly and steadily.

I claim:

1. The method of removing entrails from a decapitated fish, which comprises submerging the fish in water and applying hydraulic suction to the cut end of the submerged fish.

2. Apparatus for removing entrails from cut fish, comprising means for maintaining a pool of water, means for submerging a cut fish in said pool, and means for applying hydraulic suction to the cut end of the submerged fish.

3. Apparatus for removing entrails from cut fish, comprising a tank having an outlet orifice in a side wall, thereof spaced from the top thereof, means for maintaining in said tank a pool of water with its surface substantially higher than said orifice, means for maintaining hydraulic suction outward through said orifice, and means for submerging cut fish in said pool and moving their cut ends in succession past said orifice.

4. Apparatus for removing entrails from cut fish, comprising a tank, a conveyor in said tank having a series of troughs adapted to receive and convey cut fish from the upper part of the tank to the lower part and back to the upper part, an apertured wall at an end of each said trough, a suction pipe opening through a side of said tank with an orifice in the lower portion of the tank, means for actuating said conveyor to present the apertured end walls of said troughs successively to said orifice, and means for retaining in said troughs fish deposited therein in the upper part of the tank until the fish are returned again to said upper part of the tank.

5. Apparatus for removing entrails from cut fish, comprising a tank, a wheel mounted in said tank to revolve on a horizontal axis, said wheel having at its circumference a series of outwardly facing troughs parallel to the axis of rotation and adapted to receive cut fish, a wall at an end of each said trough, each said wall having an aperture therethrough, a casing fitted around the circumference of the wheel with a gap at the top for the reception and discharge of fish into and out of successive troughs, said tank having an opening through a side thereof arranged to register with successive apertures in the end walls of the troughs at a level substantially lower than the top of the wheel, and means for exhausting water through said opening to apply suction to said apertures as they move into registry therewith.

6. The method of removing entrails from decapitated fish, which comprises maintaining a pool of water, withdrawing water from said pool at a point well below the surface thereof, submerging decapitated fish in said pool and presenting the cut end of successive fish briefly to said point of withdrawal.

References Cited in the file of this patent
UNITED STATES PATENTS

| | | |
|---|---|---|
| 1,134,530 | Hauber | Apr. 6, 1915 |
| 1,628,968 | Gray | May 17, 1927 |
| 2,245,329 | Danielsson | June 10, 1941 |
| 2,483,470 | Lockwood et al. | Oct. 4, 1949 |